United States Patent
Lee et al.

(10) Patent No.: US 10,120,257 B2
(45) Date of Patent: Nov. 6, 2018

(54) ELECTROCHROMIC DEVICE

(71) Applicant: SAMSUNG ELECTRONICS CO., LTD., Suwon-si (KR)

(72) Inventors: Cho-Young Lee, Yongin-si (KR); Hye Jin Kim, Jeongeup-si (KR); Jun Sung Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 14/590,245

(22) Filed: Jan. 6, 2015

(65) Prior Publication Data

US 2015/0198856 A1    Jul. 16, 2015

(30) Foreign Application Priority Data

Jan. 15, 2014    (KR) .................. 10-2014-0004845

(51) Int. Cl.
*G02F 1/15*       (2006.01)
*G02F 1/19*       (2006.01)
*G02F 1/153*      (2006.01)
*C09K 9/00*       (2006.01)

(52) U.S. Cl.
CPC .............. *G02F 1/15* (2013.01); *G02F 1/1523* (2013.01); *G02F 1/1525* (2013.01); *G02F 1/19* (2013.01); *C09K 9/00* (2013.01); *G02F 2001/1536* (2013.01)

(58) Field of Classification Search
CPC .......... G02F 1/155; G02F 1/1533; G02F 1/15; G02F 1/163; G02F 1/1523; G02F 1/1525; G02F 2001/1512; G02F 1/19; B60R 1/088; G09G 3/3648

USPC .... 359/265–275, 609; 345/49, 105, 89–103; 349/16
See application file for complete search history.

(56) References Cited

U.S. PATENT DOCUMENTS

| | | | |
|---|---|---|---|
| 2002/0044717 A1 | 4/2002 | Richardson | |
| 2007/0076288 A1 | 4/2007 | Yoshimura et al. | |
| 2008/0004412 A1* | 1/2008 | Matsumoto | C08F 10/00 526/348.4 |
| 2009/0323159 A1 | 12/2009 | Yoshimura et al. | |
| 2010/0039692 A1* | 2/2010 | Yamada | G02F 1/1523 359/273 |

(Continued)

FOREIGN PATENT DOCUMENTS

| | | |
|---|---|---|
| EP | 2757413 A1 | 7/2014 |
| WO | 2013039173 A1 | 3/2013 |

OTHER PUBLICATIONS

Communication dated Jun. 9, 2015 issued by European Patent Office in counterpart European Application No. 14198481.5.

(Continued)

*Primary Examiner* — Cara Rakowski
*Assistant Examiner* — Alberto Betancourt
(74) *Attorney, Agent, or Firm* — Sughrue Mion, PLLC

(57) ABSTRACT

Disclosed herein is an electrochromic device including an active layer in which a catalyst facilitating oxidation-reduction reaction is homogeneously dispersed.
The electrochromic device includes at least one active layer to reversibly exhibit a transparent state upon hydrogenation and a reflective state upon dehydrogenation, wherein the active layer includes a catalyst to facilitate a rate of reversible conversion between the transparent state and the reflective state.

14 Claims, 11 Drawing Sheets

(56) References Cited

U.S. PATENT DOCUMENTS

| | | | |
|---|---|---|---|
| 2010/0188726 A1 | 7/2010 | Yoshimura et al. | |
| 2013/0010347 A1* | 1/2013 | Tajima | C03C 17/36 359/270 |
| 2015/0168796 A1* | 6/2015 | Yashiro | G02F 1/1533 359/265 |
| 2015/0196888 A1* | 7/2015 | Liu | B01J 19/087 204/164 |

OTHER PUBLICATIONS

Park et al., "Influence of Pt and Au nanophases on electrochromism of WO3 in nanostructure thin-film electrodes", ScienceDirect Electrochemistry Communications, Aug. 1, 2007, 5 pages total, vol. 9, No. 8, Elsevier B.V., Amsterdam, NL, XP 022158341.

Yoo et al., "Electrocatalytic Properties of TiO2-Embedded Pt Nanoparticles in Oxidation of Methanol: Particle Size Effect and Proton Spillover Effect", Electrocatalysis, Jul. 12, 2011, 10 pages total, vol. 2, No. 4, Springer Science+Business Media LLC 2011, XP 055190563.

Communication dated Nov. 8, 2017, issued by European Patent Office in counterpart European Application No. 14198481.5.

* cited by examiner (a)

(b)

ELECTROCHROMIC DEVICE

CROSS-REFERENCE TO RELATED APPLICATION(S)

This application claims priority from Korean Patent Application No. 2014-0004845, filed on Jan. 15, 2014 in the Korean Intellectual Property Office, the disclosure of which is incorporated herein by reference in its entirety.

BACKGROUND

1. Field

Apparatuses and methods consistent with the exemplary embodiments relate to a reflection-type electrochromic device that easily switches between transparent and reflective states.

2. Description of Related Art

A reflection-type electrochromic device (ECD) may switch between a light transmission mode and a light reflection mode according to applied voltage.

The reflection-type electrochromic device generally includes a laminate structure composed of substrates serving as a transparent substrate, a transparent electrode, an ion storage layer, an electrolyte layer, a catalyst layer, and an active layer.

The ion storage layer comprises transition metal oxide and protons stored in the ion storage layer are moved to the active layer upon application of voltage.

The active layer changes optical properties from a reflective state to a transmissive state upon movement of protons. Meanwhile, upon application of a reversely-charged voltage, the protons are moved back to the original position, i.e., the ion storage layer, and the optical property of the active layer is changed to the reflective state again. Such a reversible oxidation-reduction (redox) reaction causes change in optical property to transmission mode or reflection mode.

Furthermore, the electrolyte layer is disposed between the ion storage layer and the active layer and facilitates movement of ions. The catalyst layer is generally disposed between the active layer and the electrolyte layer and facilitates the oxidation-reduction reaction of the active layer.

In related art, the catalyst layer is generally at the interface of the active layer, but an electrochromic device having this structure has a problem of low light transmittance in a transmission mode because an oxidation-reduction reaction rate opposite to the interface between the active layer and the catalyst layer is lower than an oxidation-reduction reaction rate on the interface between the active layer and the catalyst layer and a catalyst layer composed of a metal is formed in the form of a layer.

SUMMARY

One or more exemplary embodiments provide an electrochromic device including an active layer in which a catalyst facilitating oxidation-reduction reaction is homogeneously dispersed.

The catalyst may be homogeneously dispersed in the form of a powder, particle or island in the active layer or at the interface the active layer and the electrolyte layer.

Additional aspects of exemplary embodiments will be set forth in part in the description which follows and, in part, will be obvious from the description, or may be learned by practice of the invention.

In an aspect according to an exemplary embodiment, there is provided an electrochromic device including a substrate, and at least one active layer configured to reversibly exhibit a transparent state upon hydrogenation and a reflective state upon dehydrogenation, and wherein the active layer includes a catalyst to facilitate a rate of reversible conversion between the transparent state and the reflective state.

The catalyst may be provided to facilitate bonding or cleavage between a metal alloy and hydrogen contained in the at least one active layer.

The catalyst may be present in the form of a powder in the at least one active layer.

The catalyst may be present in the form of a particle in the at least one active layer.

The catalyst may be present in the form of an island in the at least one active layer.

The at least one active layer may include a magnesium (Mg) alloy.

The Mg alloy may have an atomic ratio of magnesium (Mg) and an alloy material (Mg/alloy material), of about 2 to about 8.

The catalyst may include at least one selected from the group consisting of platinum (Pt), palladium (Pd), silver (Ag) and gold (Au).

The electrochromic device may further include an ion storage layer to store hydrogen supplied to the at least one active layer.

The ion storage layer may include transition metal oxide capable of transmitting and absorbing light.

The transition metal oxide may include at least one selected from the group consisting of hydrogen (H), lithium (Li), sodium (Na), titanium (Ti), molybdenum (Mo) and niobium (Nb).

The ion storage layer may include at least one selected from the group consisting of tungsten oxides with hydrogen ($H_xWO_3$), titanium oxide ($TiO_2$), molybdenum oxide ($MoO_3$) and niobium ($Nb_2O_5$).

The electrochromic device may further include an electrolyte layer configured to facilitate movement hydrogen ions.

The electrolyte layer may be provided in a liquid, gel or solid state.

The electrolyte layer may include tantalum oxide ($Ta_2O_5$).

In an aspect according to another exemplary embodiment, there is provided an electrochromic device including at least one active layer comprising a catalyst, wherein the at least one active layer is configured to alternate between a transmissive mode and a reflective mode according to a voltage applied to the active layer.

The electrochromic device may further include an ion storage layer, and a transparent electrode disposed under the ion storage layer, wherein in response to a positive voltage being applied to the transparent electrode and a negative voltage being applied to the active layer, the electrochromic device is configured to operate in a reflective mode, and in response to a negative voltage being applied to the transparent electrode and a positive voltage being applied to the active layer, the electrochromic device is configured to operate in a transmissive mode.

The electrochromic device may further include an electrolyte layer that facilitates movement of ions and is disposed between the at least one active layer and the ion storage layer.

The catalyst may be a powder that is uniformly disposed throughout the at least one active layer.

The catalyst may be in the form of particles that are uniformly disposed throughout the at least one active layer.

The catalyst may be in the form of islands that are disposed at an interface between the at least one active layer and the electrolyte layer.

The electrochromic device may further include at least two active layers, wherein the catalyst is in the form of islands that are disposed along a lower edge of each of the active layers.

BRIEF DESCRIPTION OF THE DRAWINGS

These and/or other aspects of the exemplary embodiments will become apparent and more readily appreciated from the following description of the embodiments, taken in conjunction with the accompanying drawings of which.

DETAILED DESCRIPTION

Figure 1:
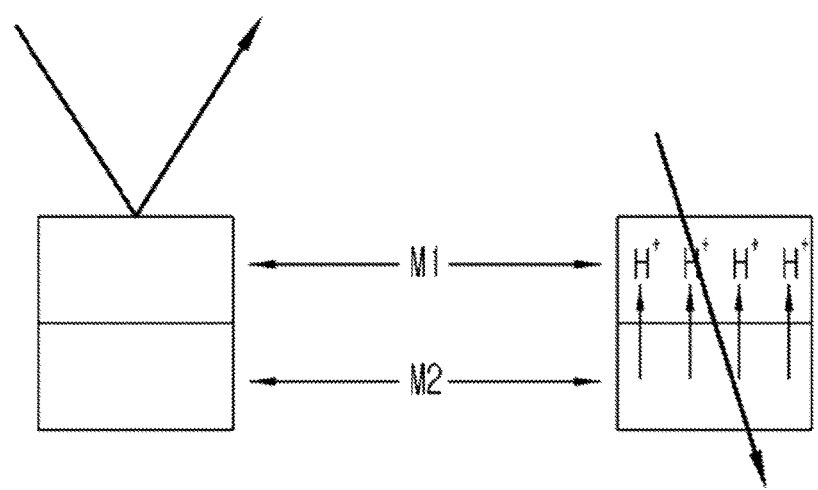
FIG. 1 is a diagram illustrating a basic configuration of an electrochromic device.

The exemplary embodiments will be described in detail with reference to the accompanying drawings, wherein like reference numerals refer to like elements throughout.

Hereinafter, an electrochromic device according to exemplary embodiments will be described in detail with reference to the annexed drawings.

The electrochromic device has an active layer that includes a catalyst to facilitate charge transfer and thereby provide superior chromic effects. First, a basic configuration of the electrochromic device will be described with reference to FIG. 1 and an operation principle of the electrochromic device will be described with reference to FIG. 2.

As illustrated in FIG. 1, the electrochromic device has a laminate structure including an active layer M1 and an ion storage layer M2 and light reflectivity of the active layer M1 is changed in response to an external stimuli.

The active layer M1 includes a light control material which changes optical properties according to concentration of a certain element. The light control material may be a Mg alloy where the Mg alloy is interconverted between a reflective state and a transmission state according to hydrogen ion ($H^+$) concentration. A Mg alloy having a low hydrogen ion ($H^+$) concentration reflects incident light to render a metal color and a Mg alloy having a high hydrogen ion ($H^+$) concentration due to hydrogen ions bonded thereto provides a transparent state due to superior transmittancy.

The ion storage layer M2 includes a material containing a certain element such as hydrogen (hereinafter, referred to as a "conversion material"). The conversion material releases or absorbs the certain element (for example, hydrogen) in response to external stimuli such as an injection and release of electric charges (electrons or holes) or light radiation.

Figure 2:
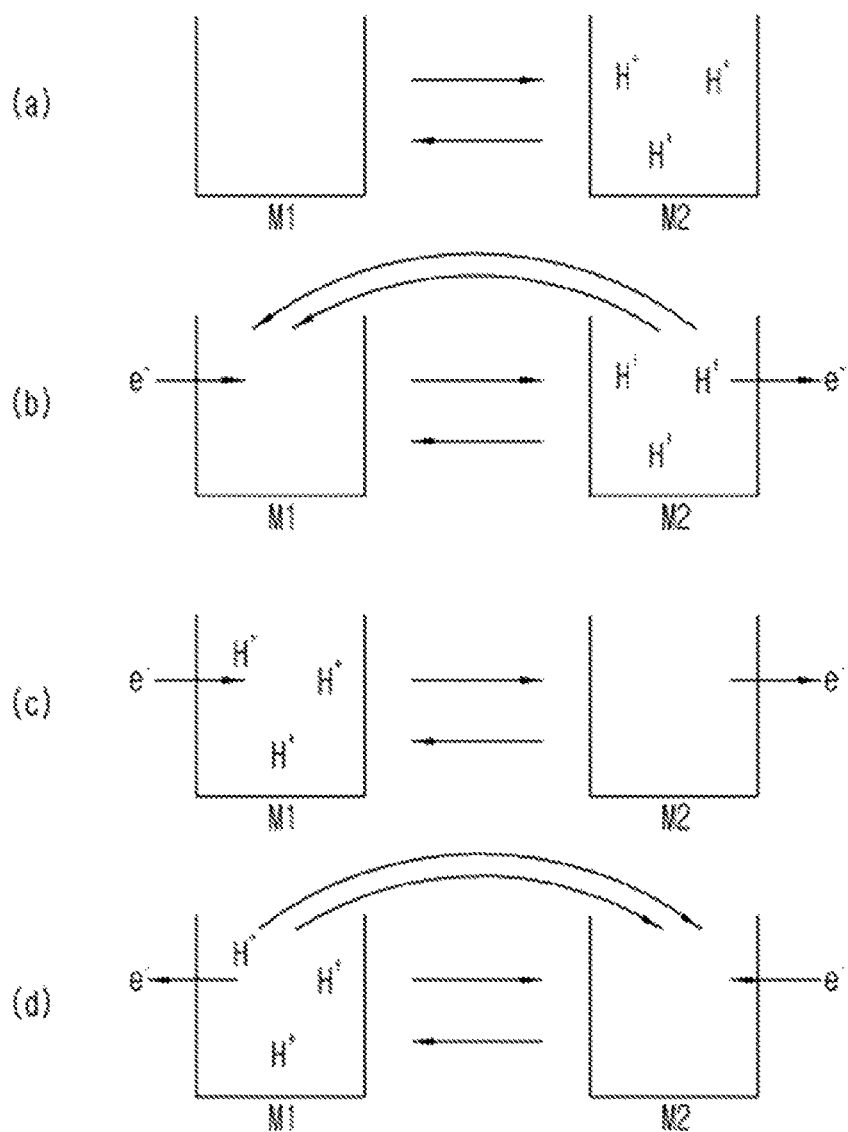
FIG. 2 is a diagram illustrating a process of moving hydrogen ions ($H^+$) from an ion storage layer to an active layer, or from the active layer to the ion storage layer by injection and release of electric charges.

Hereinafter, a principle of the movement of hydrogen ion ($H^+$) from the ion storage layer M2 to the active layer M1, or from the active layer M1 to the ion storage layer M2 by injection and release of electric charges, will be described with reference to FIG. 2. In this process, ions of the certain element (hydrogen) changing optical properties of the active layer M1 are moved based on transfer of electric charges, rather than electrochemical reaction.

Both the active layer M1 and the ion storage layer M2 are capable of absorbing and releasing hydrogen and have electrical conductivity capable of moving electric charges (electrons or holes) and ions.

Referring to FIG. 2(a), FIG. 2(a) illustrates an initial state of the active layer M1 and the ion storage layer M2 shown in FIG. 1. In the initial state of the active layer M1 and the ion storage layer M2, balance (equilibrium) between the active layer M1, which does not substantially store hydrogen, and the ion storage layer M2, which previously stores hydrogen, is kept. The active layer M1 reflects light and renders an inherent metal luster because a sufficient concentration of hydrogen is not present in the active layer M1.

Next, as illustrated in FIG. 2(b), electrons are injected into the active layer M1 and the active layer M1 is rich in electrons when a negative voltage is applied to the active layer M1 and a positive voltage is applied to the ion storage layer M2. Meanwhile, electrons are released from the ion storage layer M2 and at the same time, holes are injected thereto.

The holes injected into the ion storage layer M2 are moved from the ion storage layer M2 to the active layer M1. As a result, hydrogen ions ($H^+$) are readily released from the ion storage layer M2, while a large amount of hydrogen ions ($H^+$) injected from the ion storage layer M2 is stored in the active layer M1.

For this reason, hydrogen ion ($H^+$) balance between the active layer M1 and the ion storage layer M2 is not kept. The active layer M1 tends to retain hydrogen, and hydrogen ions ($H^+$) released from the ion storage layer M2 are moved to the active layer M1. As a result, as illustrated in FIG. 2(c), a new balance state is created. In this state, hydrogen ions ($H^+$) moved to the active layer M1 bond to the light control material, thus making the active layer M1 transparent.

In brief, the reaction described above is represented by M1+M2 (H)→M1 (H)+M2. M1 (H) and M2 (H) represent a state in which hydrogen is adhered to the active layer M1 and a state in which hydrogen is adhered to the ion storage layer M2, respectively. As such, exchange of only hydrogen ions ($H^+$) occurs between the active layer M1 and the ion storage layer M2, and reactions associated with other ions do not occur therebetween.

Next, reverse reaction occurs when a polarity of applied voltage is reversed, as illustrated in FIG. 2(d). For this reason, the present state returns to the original balance state illustrated in FIG. 2(a).

More specifically, electrons are injected into the ion storage layer M2 and the ion storage layer M2 is rich in electrons when a negative voltage is applied to the ion storage layer M2, and a positive voltage is applied to the active layer M1. Meanwhile, electrons are released from the active layer M1, and at the same time, holes are injected thereto.

The holes injected into the active layer M1 are moved from the active layer M1 to the ion storage layer M2. As a result, hydrogen ions (H$^+$) are readily released from the active layer M1, while a large amount of hydrogen ions (H$^+$) injected from the active layer M1 is stored in the ion storage layer M2.

For this reason, the new hydrogen ion (H$^+$) balance between the active layer M1 and the ion storage layer M2 is not kept, the ion storage layer M2 readily retains hydrogen, and hydrogen ions (H$^+$) released from the active layer M1 are moved to the ion storage layer M2. As a result, as illustrated in FIG. 2(d), the present state returns to the original balance state. In this state, the active layer M1 renders an inherent metal luster because a sufficient concentration of hydrogen is not present in the active layer M1.

Hereinafter, a more detailed configuration of the electrochromic device according to an exemplary embodiment will be described.

The electrochromic device according to an exemplary embodiment includes a catalyst material to facilitate oxidation-reduction reaction rate. In a related art electrochromic device, the catalyst material is dispersed as a layer around the active layer M1. In this case, there are problems in that light transmittance is deteriorated in a transmission mode and reaction rate is not uniform in the active layer M1. Accordingly, an exemplary embodiment provides an electrochromic device including an active layer M1 in which a catalyst material is uniformly dispersed in the form of a powder, a particle or an island.

Figure 3:
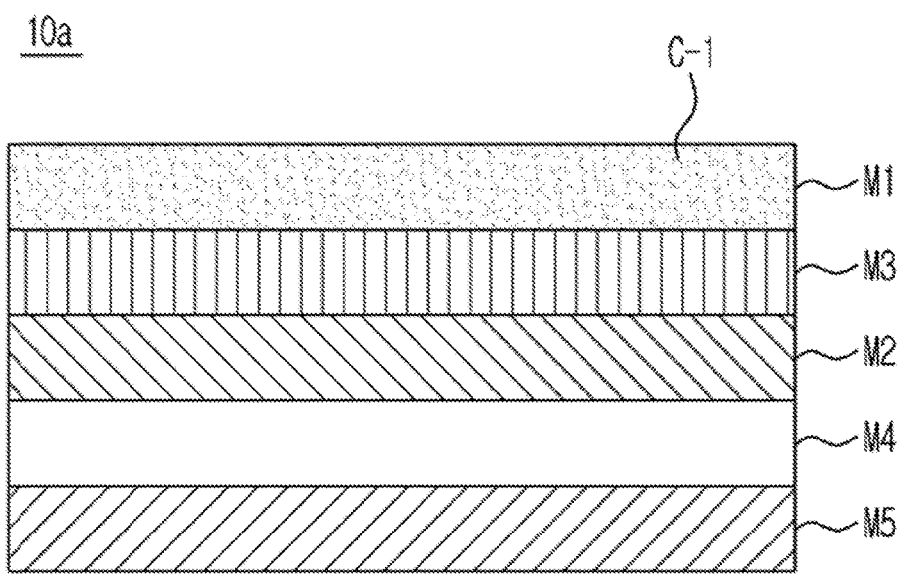
FIG. 3 is a diagram illustrating an electrochromic device according to an exemplary embodiment, including an active layer containing a catalyst dispersed in the form of a powder therein.

FIG. 3 is a diagram illustrating an electrochromic device 10a according to an exemplary embodiment, including an active layer M1 in which a catalyst is dispersed in the form of a powder.

Referring to FIG. 3, the electrochromic device 10a according to an exemplary embodiment includes a substrate M5, a transparent electrode M4 provided on the substrate M5, an ion storage layer M2 provided on the transparent electrode M4, an electrolyte layer M3 provided on the ion storage layer M2, and an active layer M1 containing a catalyst, provided on the electrolyte layer M3. Furthermore, the electrochromic device 10a according to an exemplary embodiment may further include a buffer layer to prevent oxidization of the metal contained in the active layer M1 and the buffer layer may be provided between the active layer M1 and the electrolyte layer M3.

The substrate M5 is provided to support the transparent electrode M4, the ion storage layer M2, the electrolyte layer M3 and the active layer M1 and may be composed of a transparent material.

The ion storage layer M2 includes a conversion material containing hydrogen. The conversion material includes transition metal oxide capable of transmitting and absorbing light. The transition metal oxide may include at least one selected from the group consisting of hydrogen (H), lithium (Li), sodium (Na), titanium (Ti), molybdenum (Mo) and niobium (Nb). More specifically, the transition metal oxide may include at least one selected from the group consisting of tungsten oxides with hydrogen (H$_x$WO$_3$), titanium oxide (TiO$_2$), molybdenum oxide (MoO$_3$) and niobium (Nb$_2$O$_5$).

The ion storage layer M2 receives electrons from the electrode using the conversion material and releases or absorbs hydrogen ions (H$^+$).

The ion storage layer M2 may include an electrically conductive material, in addition to the conversion material. When the electrically conductive material is present in the ion storage layer M2, ion exchange between the active layer M1 and the ion storage layer M2 is facilitated. The electrically conductive material may be an ion-conducing material such as a liquid or solid electrolyte, a conductive polymer capable of conducting electric charges (electrons or holes), or the like. Furthermore, the ion storage layer M2 may further include a bonding material such as a binder resin, in addition to the conversion material or the electrically conductive material.

The electrolyte layer M3 is provided to facilitate ion exchange between the ion storage layer M2 and the active layer M1. More specifically, the electrolyte layer M3 may be provided between the ion storage layer M2 and the active layer M1 to exchange electric charges or ions between the ion storage layer M2 and the active layer M1. When the electrolyte layer M3 is disposed, hydrogen ions (H$^+$) are readily moved via the electrolyte. The electrolyte layer M3 may be provided in a liquid, gel or solid state and include tantalum oxide (Ta$_2$O$_5$).

Furthermore, the electrochromic device 10a according to an exemplary embodiment may be provided with a film containing a conductive polymer material, instead of the electrolyte layer M3. The conductive polymer material may serve as the electrolyte layer M3 because it is doped with ions providing conductivity.

The active layer M1 includes a light control material which changes optical properties according to hydrogen ion (H$^+$) concentration and the entirety or part of the active layer M1 is formed with a light control material of a single layer or multiple layers. More specifically, the active layer M1 may include an Mg alloy material, and the Mg alloy may exemplarily include magnesium (Mg) and an alloy material at an atomic ratio of magnesium (Mg) and an alloy material, i.e., Mg/alloy material, of 2 to 8.

The electrochromic device 10a according to an exemplary embodiment has a structure in which a catalyst having a powdery form is uniformly dispersed in the active layer M1. The catalyst functions to facilitate oxidation-reduction reaction in the active layer M1 and improve the overall conversion rate of the electrochromic device 10a. The catalyst may include at least one selected from the group consisting of platinum (Pt), palladium (Pd), silver (Ag) and gold (Au).

Figure 4:
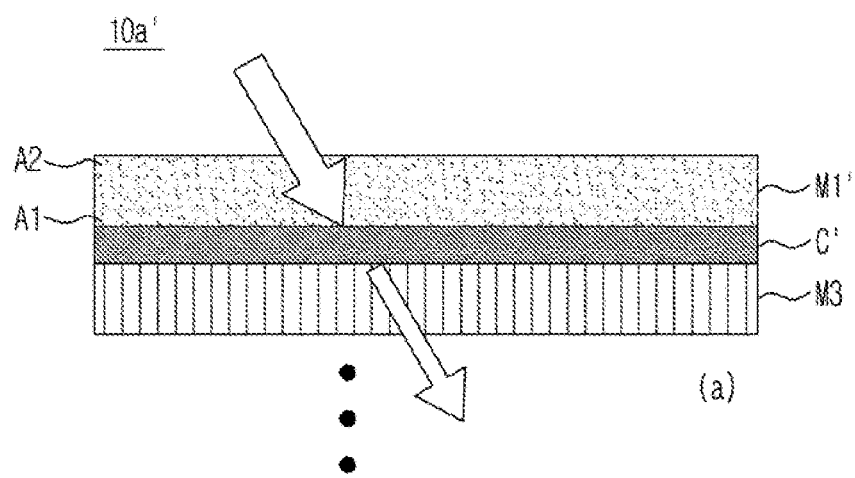
FIG. 4 is a diagram illustrating a comparison in catalyst dispersion between a related art electrochromic device and the electrochromic device according to an exemplary embodiment.
Figure 4:
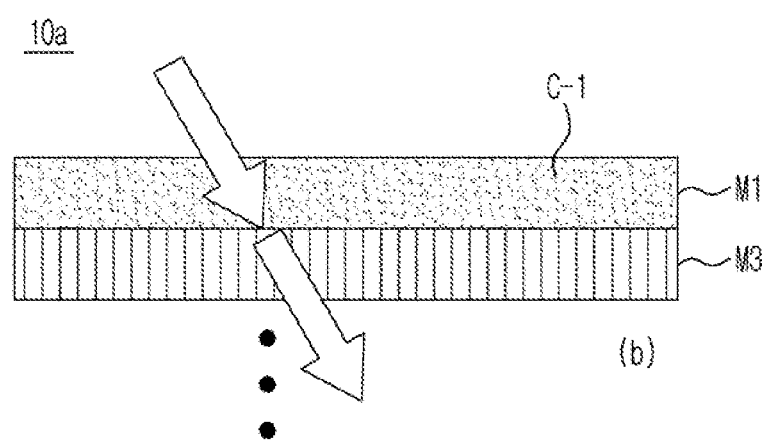

FIG. 4 is a view illustrating a comparison in catalyst dispersion between a related art electrochromic device 10a' and the electrochromic device 10a according to an exemplary embodiment.

As illustrated in FIG. 4(a), in the case of a related art electrochromic device 10a', the catalyst is formed in the form of a layer between the active layer M1' and the electrolyte layer M3'. Thus, a conversion rate at the interface A1 between the catalyst layer C' and the active layer M1 is high, but a conversion rate in an opposite part A2 is relatively low. As a result, the overall conversion rate of the electrochromic device 10a' is not advantageous.

On the other hand, in the case of the electrochromic device 10a according to an exemplary embodiment, a catalyst C-1 having a powdery form is uniformly dispersed in the active layer M1, as illustrated in FIG. 4(b), thereby resulting in uniform and rapid oxidation-reduction reactions over the entire region of the active layer M1.

In addition, in the case of a related art electrochromic device 10a', the catalyst is formed in the form of a layer, thus causing a problem of deterioration in light transmittance in a transmission mode (see FIG. 4(*a*)). However, in the case of the electrochromic device 10a according to an exemplary embodiment, a catalyst C-1 having a powdery form is uniformly dispersed in the active layer M1, thereby improving transmittance in a transmission mode (see FIG. 4(*b*)). Furthermore, in the electrochromic device 10a according to an exemplary embodiment, the catalyst C-1 having a powdery form is added to the active layer M1, thereby making a crystal structure of Mg alloy loose, increasing mobility of hydrogen ions (H$^+$) and improving the overall conversion rate.

Hereinafter, an operation of the electrochromic device 10a shown in FIG. 4 will be described with reference to FIGS. 5A to 5D.

FIGS. 5A to 5D are diagrams illustrating the operation of the electrochromic device 10a shown in FIG. 4. FIG. 5 exemplifies a case in which the active layer M1 is provided as an alloy of magnesium and nickel (Mg$_2$Ni), the electrolyte layer M3 is provided as a solid, the ion storage layer M2 is provided as H$_x$WO$_3$ and the transparent electrode M4 is provided as an ITO material.

Figure 5A:
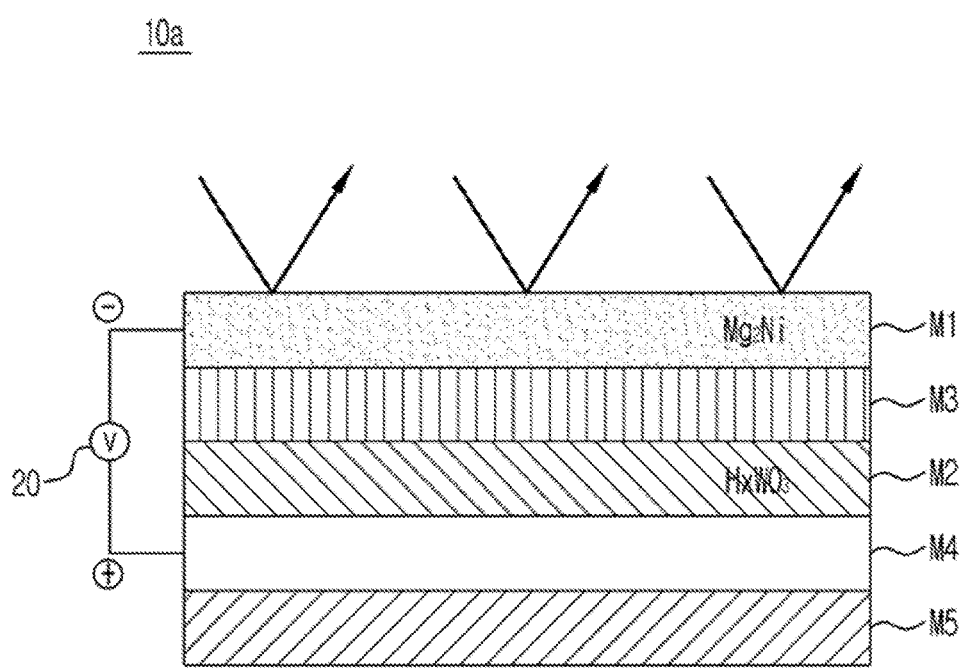
FIGS. 5A to 5D are diagrams illustrating an operation of the electrochromic device shown in FIG. 4.

Referring to FIG. 5A, in the electrochromic device 10a according to an exemplary embodiment, a negatively charged electrode of a power supply 20 is connected to the active layer M1 and a positive power is connected to a transparent electrode M4. In the electrochromic device 10a according to an exemplary embodiment, a negative power may be directly connected to the active layer M1 without providing an additional electrode around the active layer M1 because the active layer M1 is composed of a metal material. Furthermore, hydrogen is not substantially stored in the active layer M1. Hydrogen is substantially stored in the ion storage layer M2 and a balance is kept between the layers. Thus, the active layer M1 is present in the form of Mg$_2$Ni and renders an inherent metal luster while the surface thereof reflects light.

Figure 5B:
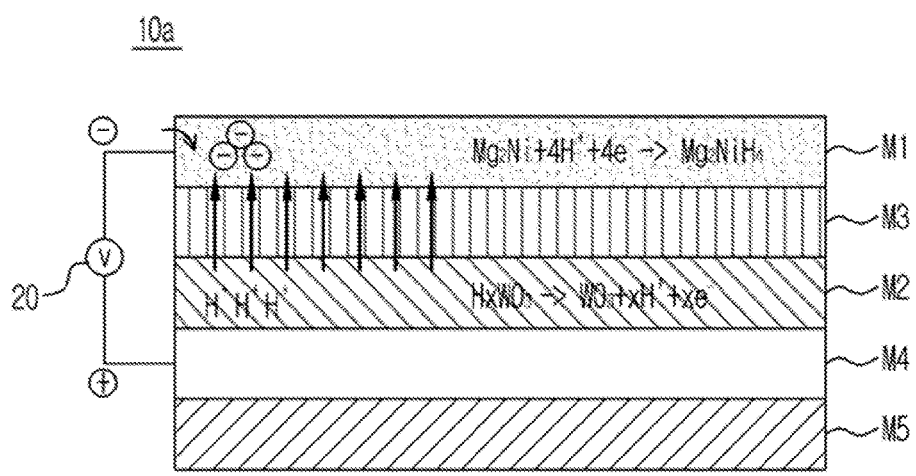

Power is supplied to the electrochromic device 10a keeping the balance via the power supply 20. As illustrated in FIG. 5B, electrons are injected into the active layer M1 when a negative voltage is applied to the active layer M1 and a positive voltage is applied to an ITO electrode. Thus, the active layer M1 is rich in electrons and the ion storage layer M2 is rich in hydrogen ions (H$^+$).

For this reason, the hydrogen ion (H$^+$) balance between the active layer M1 and the ion storage layer M2 is not kept, the active layer M1 tends to retain hydrogen ions (H$^+$), and hydrogen ions (H$^+$) released from the ion storage layer M2 are moved to the active layer M1 via the electrolyte layer M3.

In conclusion, the ion storage layer M2 performs an oxidization reaction (represented by the following Reaction Scheme 1) and the active layer M1 performs a reduction reaction (represented by the following Reaction Scheme 2).

H$_x$WO$_3$→WO$_3$+xH$^+$+xe$^-$      Reaction Scheme 1

Mg$_2$Ni+4H$^+$+4e$^-$→Mg$_2$NiH$_4$      Reaction Scheme 2

Figure 5C:
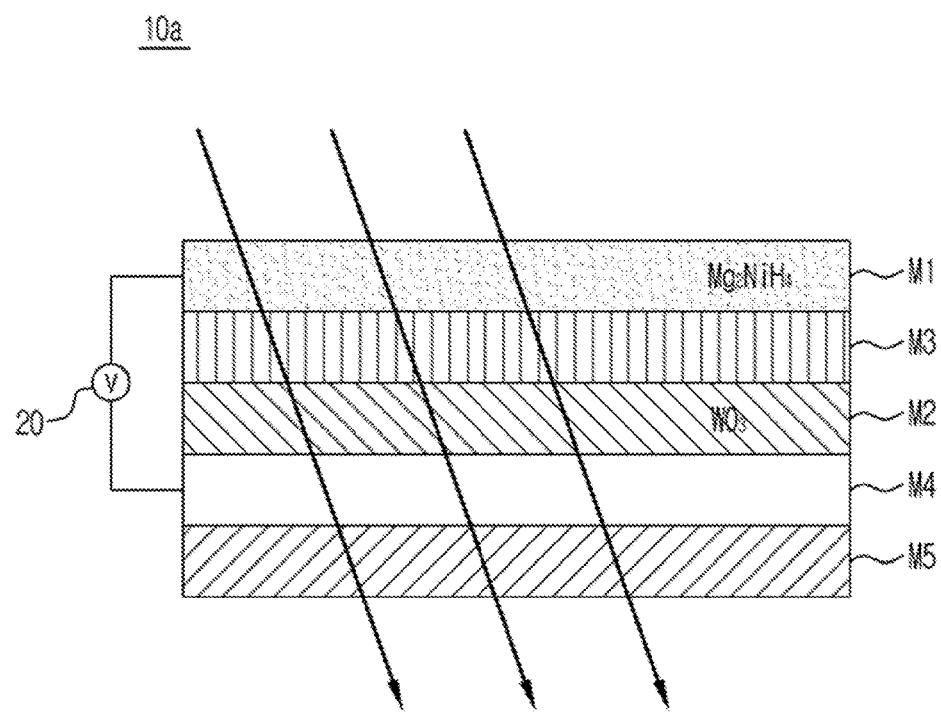

As a result, the magnesium-nickel alloy (Mg$_2$Ni) of the active layer M1 is bonded to hydrogen ions (H$^+$) and optical property is changed to a transmission mode, as illustrated in FIG. 5C.

Figure 5D:
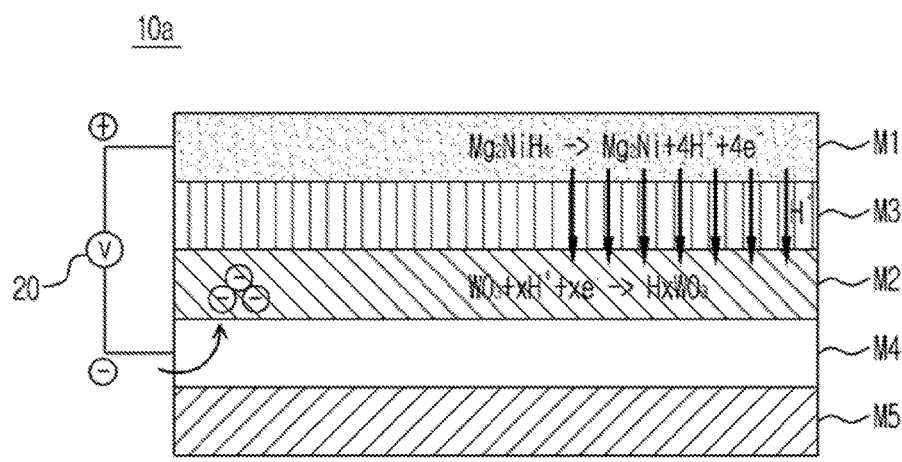

Next, power is supplied via the power supply 20 so that the electrochromic device 10a, keeping the balance after the optical property is changed, implements a metal appearance again. As illustrated in FIG. 5D, electrons are injected into the ion storage layer M2 through an ITO electrode, when a positive voltage is applied to the active layer M1 and a negative voltage is applied to the ITO electrode. As a result, electrons are rich in the ion storage layer M2 and hydrogen ions H$^+$ are relatively rich in the active layer M1.

For this reason, the balance in hydrogen ion (H$^+$) between the active layer M1 and the ion storage layer M2 is not kept, the ion storage layer M2 tends to retain hydrogen ions (H$^+$) and hydrogen ions (H$^+$) released from the active layer M1 are moved to the ion storage layer M2 via the electrolyte layer M3.

In conclusion, the ion storage layer M2 performs a reduction reaction (represented by the following Reaction Scheme 3) and the active layer M1 performs an oxidization reaction (represented by the following Reaction Scheme 4).

WO$_3$+xH$^+$+xe$^-$→H$_x$WO$_3$      Reaction Scheme 3

Mg$_2$NiH$_4$→Mg$_2$Ni+4H$^+$+4e$^-$      Reaction Scheme 4

As a result, the magnesium-nickel alloy of the active layer M1 lacks hydrogen ions (H$^+$) and the present state is returned back to a reflective state as shown in FIG. 5A.

Hereinafter, several aspects of the exemplary embodiments will be described in detail.

Figure 6:
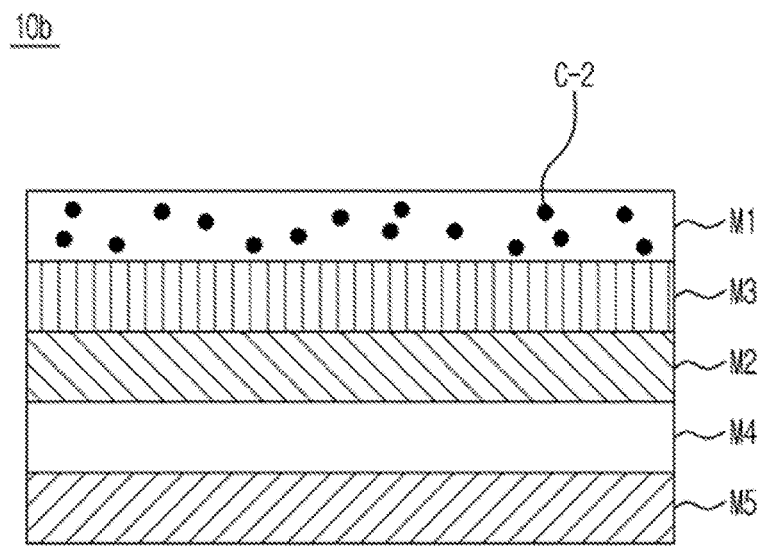
FIG. 6 is a diagram illustrating a structure of an electrochromic device according to another exemplary embodiment, including an active layer containing a catalyst dispersed in the form of a particle therein.

FIG. 6 is a diagram illustrating a structure of an electrochromic device 10b according to another exemplary embodiment, including an active layer M1 containing a catalyst C-2 dispersed in the form of a particle therein.

Referring to FIG. 6, the electrochromic device 10b according to another exemplary embodiment includes a substrate M5, a transparent electrode M4 provided on the substrate M5, an ion storage layer M2 provided on the transparent electrode M4, an electrolyte layer M3 provided on the ion storage layer M2, and an active layer M1 containing a catalyst C-2 disposed in the form of a particle, provided on the electrolyte layer M3. Furthermore, the electrochromic device 10b according to an exemplary embodiment may further include a buffer layer to prevent oxidization of the metal contained in the active layer M1 and the buffer layer may be provided between the active layer M1 and the electrolyte layer M3.

Configurations of the substrate M5, the transparent electrode M4, the ion storage layer M2 and the electrolyte layer M3 are the same as those shown in FIG. 3 and a repeated explanation thereof is omitted and only differences associated with the active layer M1 are described.

The electrochromic device 10b according to another exemplary embodiment has a structure in which a catalyst C-2 having a particle form is homogeneously dispersed in the active layer M1. The catalyst C-2 functions to facilitate oxidation-reduction reaction in the active layer M1 and to improve the overall conversion rate of the electrochromic device 10b as compared to the case in which the catalyst layer C' is formed in the form of a layer. The catalyst may include at least one selected from the group consisting of platinum (Pt), palladium (Pd), silver (Ag) and gold (Au).

Figure 7:
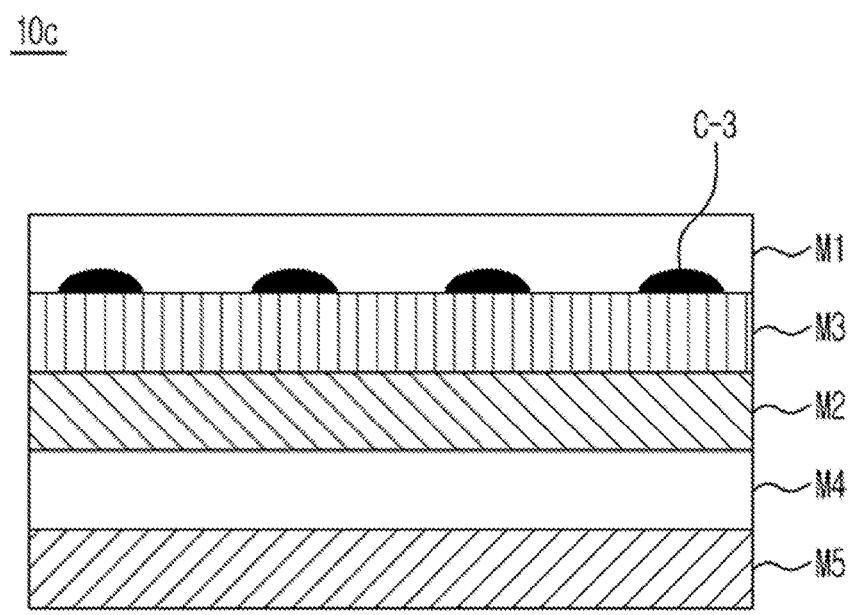
FIG. 7 is a diagram illustrating a structure of an electrochromic device according to another exemplary embodiment, including an active layer containing a catalyst dispersed in the form of an island therein.

FIG. 7 is a diagram illustrating a structure of an electrochromic device 10c according to another exemplary embodiment, including an active layer M1 containing a catalyst C-3 dispersed in the form of an island therein.

Referring to FIG. 7, the electrochromic device 10c according to another exemplary embodiment includes a substrate M5, a transparent electrode M4 provided on the substrate M5, an ion storage layer M2 provided on the transparent electrode M4, an electrolyte layer M3 provided on the ion storage layer M2, and an active layer M1 containing a catalyst C-3 disposed in the form of an island, provided on the electrolyte layer M3. Furthermore, the electrochromic device 10c according to an exemplary embodiment may further include a buffer layer to prevent oxidization of the metal contained in the active layer M1 and the buffer layer may be provided between the active layer M1 and the electrolyte layer M3.

Configurations of the substrate M5, the transparent electrode M4, the ion storage layer M2 and the electrolyte layer M3 are the same as those shown in FIG. 3 and repeated explanation thereof is omitted and only the difference associated with the active layer M1 is described.

The electrochromic device 10c according to an exemplary embodiment may include a catalyst C-3 at the interface between the active layer M1 and the electrolyte layer M3. The island form may be a semispherical shape as shown in FIG. 7, but it is not limited thereto. It is understood that the island form may include shapes that fall into any scope that is easily conceived by those skilled in the art.

The catalyst C-3 provided in the form of an island performs an inherent function of the catalyst of boosting an oxidation-reduction reaction rate and improving light transmittance in a transmission mode as compared to the case in which the catalyst layer C' is formed in the form of a layer.

Figure 8:
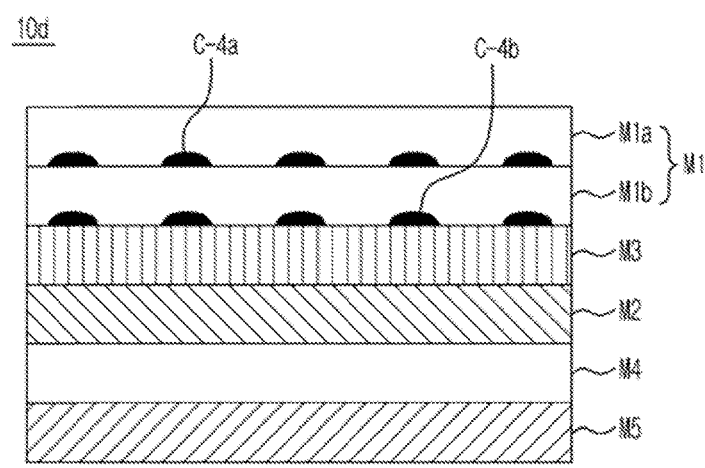
FIG. 8 is a diagram illustrating a structure of an electrochromic device according to another exemplary embodiment, including an active layer of a multilayer film containing a catalyst dispersed in the form of an island therein.

FIG. 8 is a view illustrating a structure of an electrochromic device 10d according to another exemplary embodiment, including an active layer M1 of a multilayer film containing a catalyst dispersed in the form of an island.

Referring to FIG. 8, the electrochromic device 10d according to an exemplary embodiment may include active layers M1a and M1b provided as a multilayer film and a catalyst C-4a and C-4b may be provided at the interface between the layers. The multilayer film may be provided as an Mg alloy and concentrations of the magnesium and the alloy metal may be different. Furthermore, the electrochromic device 10d according to an exemplary embodiment may further include a buffer layer to prevent oxidization of the metal contained in the active layer M1 and the buffer layer may be provided between the active layer M1 and the electrolyte layer M3.

The electrochromic device capable of improving reaction rate and improving light transmission in a transmission mode due to a catalyst disposed in the active layer M1 has been described.

Herein, a case in which the active layer M1 exhibits reversibly light transmission and reflection properties via movement of hydrogen ions $H^+$ is described as an example, but in addition to hydrogen ions ($H^+$), lithium ions ($Li^+$) or sodium ions ($Na^+$) are moved between the active layer M1 and the ion storage layer M2 to cause conversion between transmission and reflection modes.

In addition, the example in which the catalyst is dispersed in the active layer M1 is not limited to the examples described above and it is understood that the aspects of the exemplary embodiments include other examples which may be apparent by those skilled in the art.

As apparent from the foregoing, the electrochromic device according to embodiments described above has the following effects.

First, a catalyst component is uniformly disposed in the form of a powder, particle or island, rather than in the form of a layer, in the active layer or at the interface between the active layer and the electrolyte layer or at the interface between the active layers, thereby improving light transmittance in a transmission mode.

In addition, the catalyst may be homogeneously dispersed over the active layer, thereby improving reaction rate due to uniform reaction over the entire region of the active layer.

In addition, the catalyst may be disposed over the active layer, thereby making a crystal structure of Mg alloy looser, increasing mobility of protons and improving the overall conversion rate.

Although a few exemplary embodiments of the inventive concepts have been shown and described, it would be appreciated by those skilled in the art that changes may be made to these exemplary embodiments without departing from the principles and spirit of the invention, the scope of which is defined in the claims and their equivalents.

What is claimed is:

1. An electrochromic device comprising:
a substrate; and
at least one active layer structure configured to reversibly exhibit a transparent state upon hydrogenation and a reflective state upon dehydrogenation, and
wherein the at least one active layer structure comprises:
a first active layer;
a second active layer disposed on the first active layer so as to be in contact with the first active layer; and
a catalyst comprising:
a first group of islands that is formed on a first planar surface, at an interface between the first active layer and the second active layer; and
a second group of islands that is formed on a second planar surface that is different than the first planar surface, at an interface between the second active layer and an electrolyte layer,
wherein the catalyst facilitates a rate of reversible conversion between the transparent state and the reflective state.

2. The electrochromic device according to claim 1, wherein the catalyst is provided to facilitate bonding or cleavage between a metal alloy and hydrogen contained in the at least one active layer structure.

3. The electrochromic device according to claim 1, wherein the at least one active layer structure comprises a magnesium (Mg) alloy.

4. The electrochromic device according to claim 3, wherein the Mg alloy has an atomic ratio of magnesium (Mg) and an alloy material (Mg/alloy material), of about 2 to about 8.

5. The electrochromic device according to claim 1, wherein the catalyst comprises at least one selected from the group consisting of platinum (Pt), palladium (Pd), silver (Ag) and gold (Au).

6. The electrochromic device according to claim 1, further comprising an ion storage layer to store hydrogen supplied to the at least one active layer structure.

7. The electrochromic device according to claim 6, wherein the ion storage layer comprises transition metal oxide capable of transmitting and absorbing light.

8. The electrochromic device according to claim 7, wherein the transition metal oxide comprises at least one selected from the group consisting of hydrogen (H), lithium (Li), sodium (Na), titanium (Ti), molybdenum (Mo) and niobium (Nb).

9. The electrochromic device according to claim 6, wherein the ion storage layer comprises at least one selected from the group consisting of tungsten oxides with hydrogen ($H_xWO_3$), titanium oxide ($TiO_2$), molybdenum oxide ($MoO_3$) and niobium ($Nb_2O_5$).

10. The electrochromic device according to claim 1, wherein the electrolyte layer is configured to facilitate movement of hydrogen ions.

11. The electrochromic device according to claim 10, wherein the electrolyte layer is provided in a liquid, gel or solid state.

12. The electrochromic device according to claim 10, wherein the electrolyte layer comprises tantalum oxide ($Ta_2O_5$).

13. An electrochromic device comprising:
   a substrate; and
   at least one active layer structure configured to reversibly exhibit a transparent state upon hydrogenation and a reflective state upon dehydrogenation, and
   wherein the at least one active layer structure comprises:
      a first active layer;
      a second active layer disposed on the first active layer so as to be in contact with the first active layer; and
      a catalyst comprising:
         a first group of islands that is formed on a first planar surface, at an interface between the first active layer and the second active layer; and
         a second group of islands that is formed on a second planar surface that is different than the first planar surface, at an interface between the second active layer and an electrolyte layer,
   wherein the catalyst facilitates a rate of reversible conversion between the transparent state and the reflective state.

14. An electrochromic device comprising:
   a substrate; and
   at least one active layer structure configured to reversibly exhibit a transparent state upon hydrogenation and a reflective state upon dehydrogenation,
   wherein the at least one active layer structure comprises:
      a first active layer;
      a second active layer disposed on the first active layer so as to be in contact with the first active layer; and
      a catalyst comprising:
         a first group of islands that is formed on a first planar surface, at an interface between the first active layer and the second active layer; and
         a second group of islands that is formed on a second planar surface that is different than the first planar surface, at an interface between the second active layer and an electrolyte layer,
   wherein the catalyst facilitates a rate of reversible conversion between the transparent state and the reflective state, and
   wherein a voltage is applied to the at least one active layer structure.

* * * * *